United States Patent
Kuramitsu et al.

(10) Patent No.: US 11,472,469 B2
(45) Date of Patent: Oct. 18, 2022

(54) ELECTRIC POWER STEERING DEVICE

(71) Applicants: DENSO CORPORATION, Kariya (JP); Nagoya Institute of Technology, Nagoya (JP)

(72) Inventors: Shuji Kuramitsu, Kariya (JP); Hiroyasu Otake, Kariya (JP); Ryo Kano, Kariya (JP); Yoshifumi Morita, Nagoya (JP); Hironao Watanabe, Nagoya (JP); Takayuki Kato, Nagoya (JP)

(73) Assignees: DENSO CORPORATION, Kariya (JP); NAGOYA INSTITUTE OF TECHNOLOGY, Nagoya (JP)

( * ) Notice: Subject to any disclaimer, the term of this patent is extended or adjusted under 35 U.S.C. 154(b) by 358 days.

(21) Appl. No.: 16/701,567

(22) Filed: Dec. 3, 2019

(65) Prior Publication Data

US 2020/0180683 A1 Jun. 11, 2020

(30) Foreign Application Priority Data

Dec. 5, 2018 (JP) .............................. JP2018-228128

(51) Int. Cl.
 *B62D 5/04* (2006.01)
(52) U.S. Cl.
 CPC ......... *B62D 5/0463* (2013.01); *B62D 5/0409* (2013.01); *B62D 5/0424* (2013.01)
(58) Field of Classification Search
 CPC ...... B62D 5/04; B62D 5/0463; B62D 5/0424; B62D 5/0409
 See application file for complete search history.

(56) References Cited

U.S. PATENT DOCUMENTS

| | | | |
|---|---|---|---|
| 6,845,308 B2 * | 1/2005 | Kobata | H04B 1/20 381/86 |
| 2006/0060412 A1 * | 3/2006 | Bolourchi | B62D 5/06 180/443 |
| 2009/0292421 A1 * | 11/2009 | Williams | B62D 5/04 701/42 |
| 2010/0042295 A1 | 2/2010 | Shibata et al. | |
| 2011/0112724 A1 * | 5/2011 | Kariatsu | B62D 5/046 701/41 |

FOREIGN PATENT DOCUMENTS

| | | | | |
|---|---|---|---|---|
| EP | 1871001 | * | 12/2007 | ............... B62D 5/04 |
| JP | 2004-82798 A | | 3/2004 | |
| JP | 2008-114749 A | | 5/2008 | |
| JP | 2008114726 A | | 5/2008 | |
| JP | 5168882 B2 | | 3/2013 | |

* cited by examiner

*Primary Examiner* — Tony H Winner
(74) *Attorney, Agent, or Firm* — Maschoff Brennan (57) ABSTRACT

An electric power steering device including a column actuator disposed on a column side of the intermediate shaft and outputting a column assist torque; a rack actuator disposed on a rack side of the intermediate shaft and outputting a rack assist torque; a column torque sensor coaxially disposed with the steering shaft and detecting a column torsion torque; a rack torque sensor coaxially disposed with the intermediate shaft and detecting a rack torsion torque; and a calculator calculating instruction values of the column assist torque and the rack assist torque based on the torsion torques.

3 Claims, 5 Drawing Sheets

ELECTRIC POWER STEERING DEVICE

CROSS REFERENCE TO RELATED APPLICATION

The present application is based on and claims the benefit of priority of Japanese Patent Application No. 2018-228128, filed on Dec. 5, 2018, the disclosure of which is incorporated herein by reference.

TECHNICAL FIELD

The present disclosure generally relates to an electric power steering device.

BACKGROUND INFORMATION

In the related art, it is known that an electric power steering device for assisting a drivers steering operation uses a plurality of actuators that generate a steering assist torque.

For example, one of two electric motors may be disposed on a column, while the other is disposed on a rack. An electronic control unit or an ECU controls drive of each of the motors based on a steering torque detected by a torque sensor that is disposed on a steering shaft.

The installation position of the torque sensor of the electric power steering device is not limited to the steering shaft. However, the related art does not disclose an installation position of the torque sensor other than the steering shaft, nor does the related art disclose an assist torque calculation method according to the installation position of the torque sensor that is used for a control.

SUMMARY

It is an object of the present disclosure to provide an electric power steering device including a plurality of actuators enabled to appropriately calculate an assist torque according to an installation position of a torque sensor that is used for a control.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, a plurality of embodiments of the electric power steering device will be described based on the drawings. The electric power steering device of each embodiment is an apparatus for outputting a steering assist torque by a plurality of actuators in a steering system of a vehicle. In the following embodiments, substantially same structural parts are designated with the same reference numerals thereby to simplify the description. The following first to third embodiments may collectively be referred to as a present embodiment.

Figure 1:
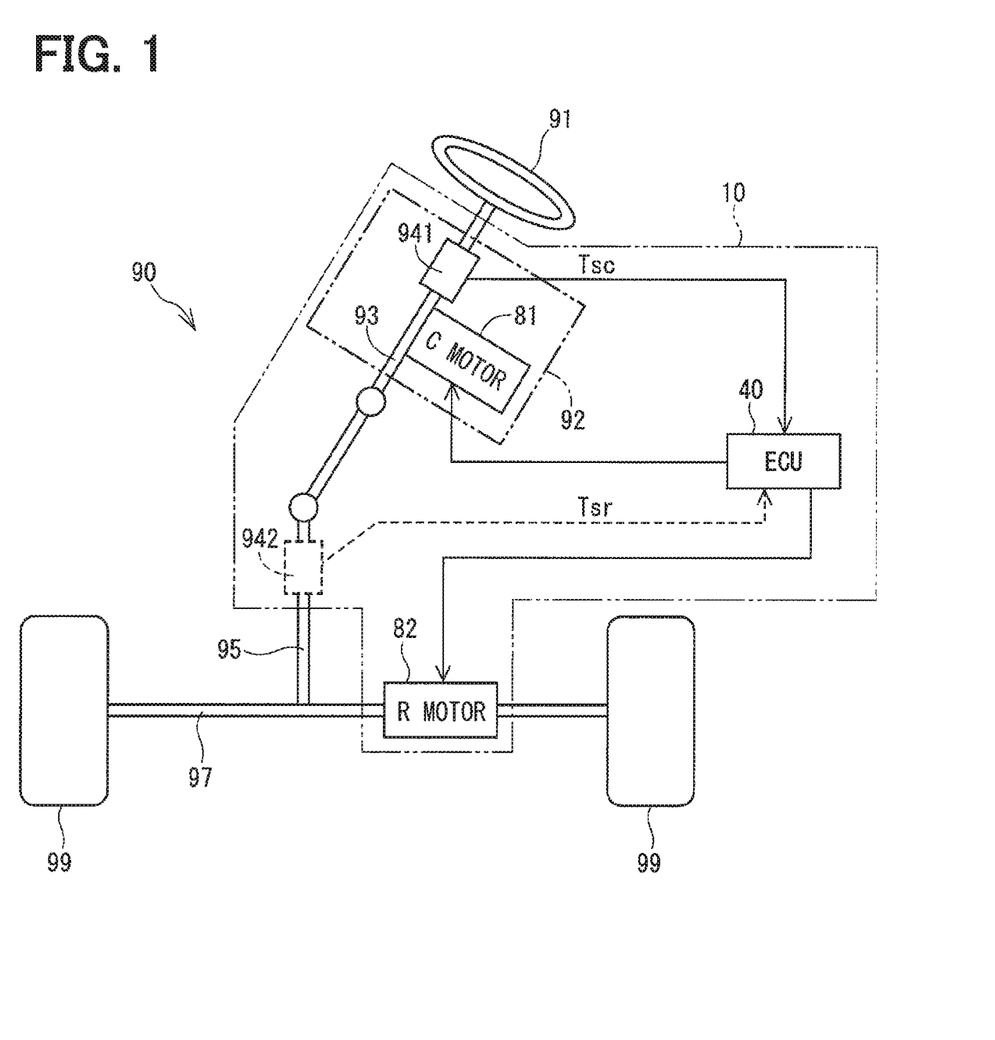
FIG. 1 is a configuration diagram of an electric power steering device according to each of the embodiments of the present disclosure.

The configuration common to each of the embodiments will be described with reference to FIGS. 1 to 2. FIG. 1 shows a configuration of an electric power steering device 10 applied to a steering system 90. The steering system 90 includes a steering wheel 91, a steering shaft 93, an intermediate shaft 95, a rack 97 and the like. The steering shaft 93 is accommodated in a column 92, a steering wheel 91 is connected to one end, and an intermediate shaft 95 is connected to the other end thereof. At the end opposite of the intermediate shaft 95 relative to the steering wheel 91, the rack 97 is provided which converts rotation into reciprocal motion and transmits the motion by a rack and pinion mechanism. When the rack 97 reciprocates, a tire 99 is steered.

In the steering system 90, the electric power steering device 10 generates a steering assist torque by a column motor ("C MOTOR" in the drawing) 81 and a rack motor ("R MOTOR" in the drawing) 82 which are two actuators. In the specification, this driving method of the electric power steering device 10 is referred to as a "twin assist method." The twin assist method is effective for a large torque output. The electric power steering device 10 includes a column motor 81, a rack motor 82, a column torque sensor 941 or a rack torque sensor 942, and an ECU, or an electronic control unit, 40 as a "calculator."

A column motor 81 as a "column actuator" is provided on a column side close to the column 92 with respect to the intermediate shaft 95. A rack motor 82 as a "rack actuator" is provided on a rack side close to the rack 97 with respect to the intermediate shaft 95. Hereinafter, a steering assist torque output from the column motor 81 is referred to as a "column assist torque," and the steering assist torque output from the rack motor 82 is referred to as a "rack assist torque."

The column motor 81 and the rack motor 82 are appropriately abbreviated as motors 81 and 82. In the present embodiment, the detailed configuration and driving method of the motors 81 and 82 do not matter. For example, the motors 81 and 82 may be constituted by three-phase brushless motors, and an instruction voltage is calculated by a current feedback control. The inverter is driven by a PWM signal generated based on the instruction voltage, and a direct current (DC) voltage of an in-vehicle battery is converted to a three-phase AC voltage and applied to the respective phase windings of the motors 81 and 82. Thereby, the motors 81 and 82 output the desired assist torque. Also, for example, the motors 81 and 82 may be configured as a two-system motor redundantly having two sets of three-phase winding.

In FIG. 1 covering the respective embodiments, two torque sensors, the column torque sensor 941 shown by a solid line and the rack torque sensor 942 shown by a broken line are described. In the first embodiment, the column torque sensor 941 is provided, and in the second embodiment, the rack torque sensor 942 is provided. In the third embodiment, both the column torque sensor 941 and the rack torque sensor 942 are provided. The torque sensors 941 and 942 detect a torsion torque based on a torsion angle of a torsion bar.

Figure 3:
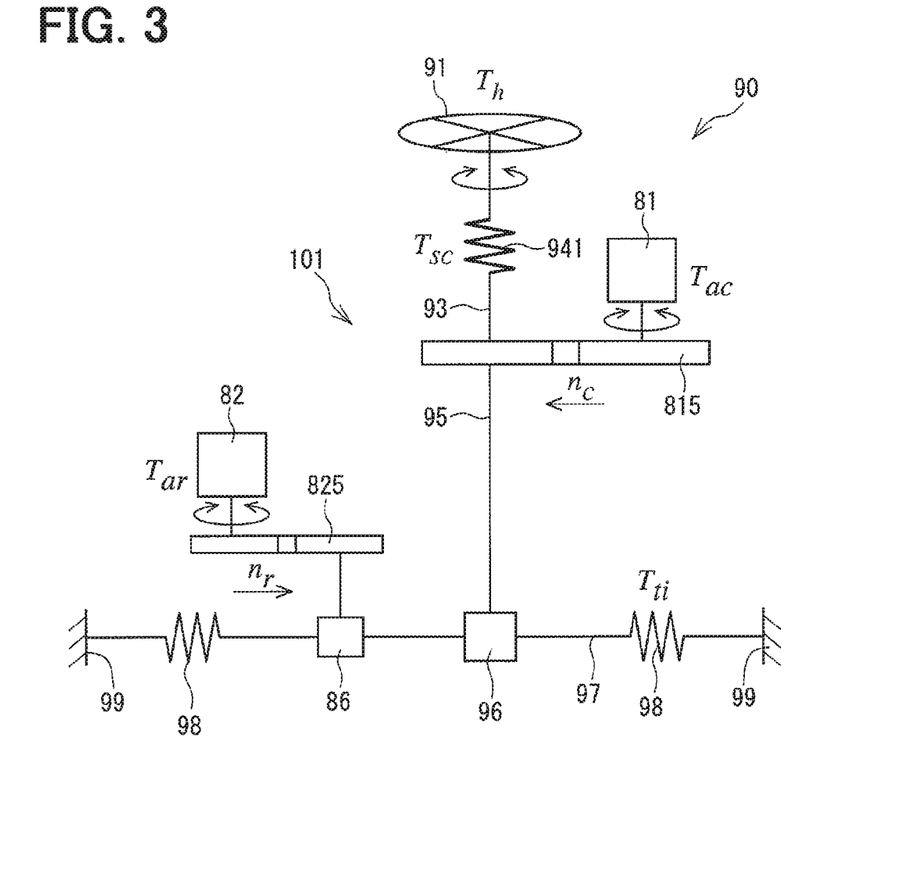
FIG. 3 is a schematic diagram of a relationship of assist torques in the electric power steering device according to a first embodiment of the present disclosure.
Figure 4:
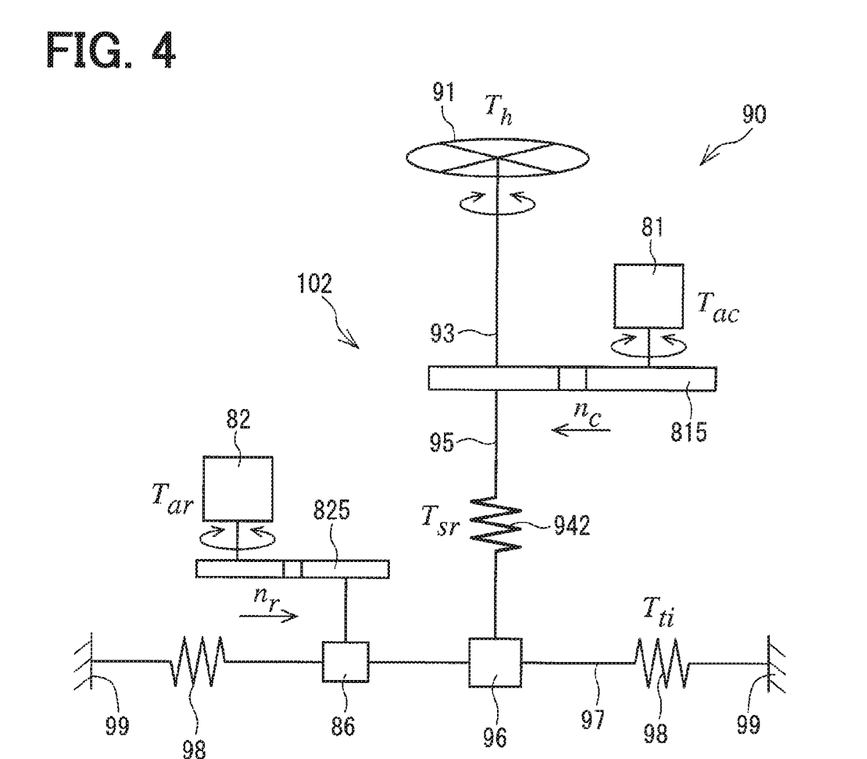
FIG. 4 is a schematic diagram of a relationship of the assist torques in the electric power steering device according to a second embodiment of the present disclosure.
Figure 5:
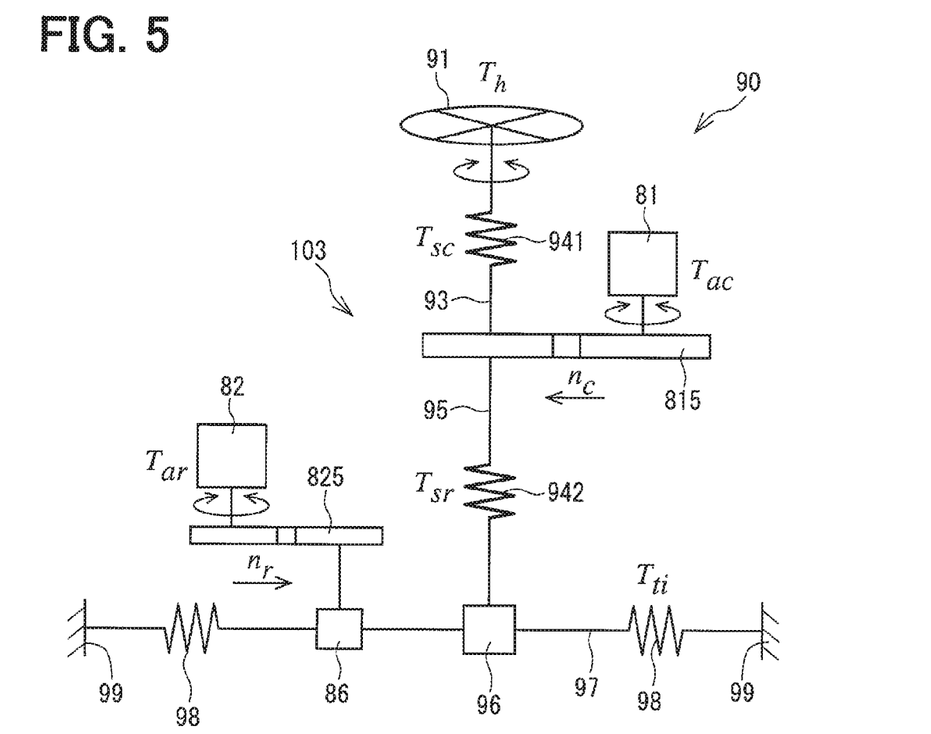
FIG. 5 is a schematic diagram of a relationship of the assist torques in the electric power steering device according to a third embodiment of the present disclosure.

The column torque sensor 941 is installed coaxially with the steering shaft 93 in the column 92, and detects a column torsion torque Tsc applied to the steering shaft 93. More specifically, as shown in FIGS. 3 to 5, the column torque sensor 941 is disposed on the steering shaft 93 at a position closer to the steering wheel 91 than a position where the output of the column motor 81 is transmitted via a column speed reducer 815.

The rack torque sensor 942 is installed coaxially with the intermediate shaft 95, and detects a rack torsion torque Tsr applied to the intermediate shaft 95. Specifically, as shown in FIGS. 3 to 5, the rack torque sensor 942 is installed on the intermediate shaft 95 on a rack 97 side relative to a position where the output of the column motor 81 is transmitted via the column speed reducer 815. The rack torque sensor 942 is not, strictly speaking, installed on the rack 97. However, in the specification of the present disclosure, the torque sensor installed on the intermediate shaft 95 is referred to as a "rack torque sensor."

The ECU 40 includes a microcomputer, a drive circuit and the like, and includes a CPU, a ROM, an I/O (not shown), and a bus line connecting those components. The ECU 40 performs software processing by executing a program stored in advance using the CPU, and/or performs control using hardware processing by a dedicated electronic circuit. The ECU 40 of the present embodiment calculates instruction values of the column assist torque and the rack assist torque based at least on the column torsion torque Tsc detected by the column torque sensor 941. Other parameters used for the calculation of the assist torque are described later with reference to FIG. 2.

Further, similar to general motor control, the ECU 40 obtains a phase current from a current sensor provided in the inverter or on a current path connecting the inverter and the winding set. Further, the ECU 40 obtains a motor angle from a rotation angle sensor provided in each of the column motor 81 and the rack motor 82, and time-differentiates the motor angle to calculate a motor angular speed. The motor angle is also used for a dq coordinate conversion calculation in a vector control.

Since such points are a general, well-known technique, illustration of the rotation angle sensor and the like is omitted from FIG. 1. Then, the ECU 40 performs a current feedback control so that an actual current follows an instruction current calculated based on the instruction value of the assist torque. In addition, in the present embodiment, information of a vehicle speed V detected by a vehicle speed sensor (not shown in FIG. 1) is acquired by the ECU 40.

Subsequently, a control configuration of the ECU 40 of each of the embodiments is described with reference to FIG. 2. The ECU 40 has at least a column base assist controller 51 and a rack base assist controller 61. The column base assist controller 51 calculates a column base assist torque Tac_b based on the torsion torque Ts and the like. The rack base assist controller 61 calculates a rack base assist torque Tar_b based on the torsion torque Ts and the like. Note that the torsion torque Ts may be the column torsion torque Tsc or the rack torsion torque Tsc according to the installation position of the torque sensor used for a control.

Figure 2:
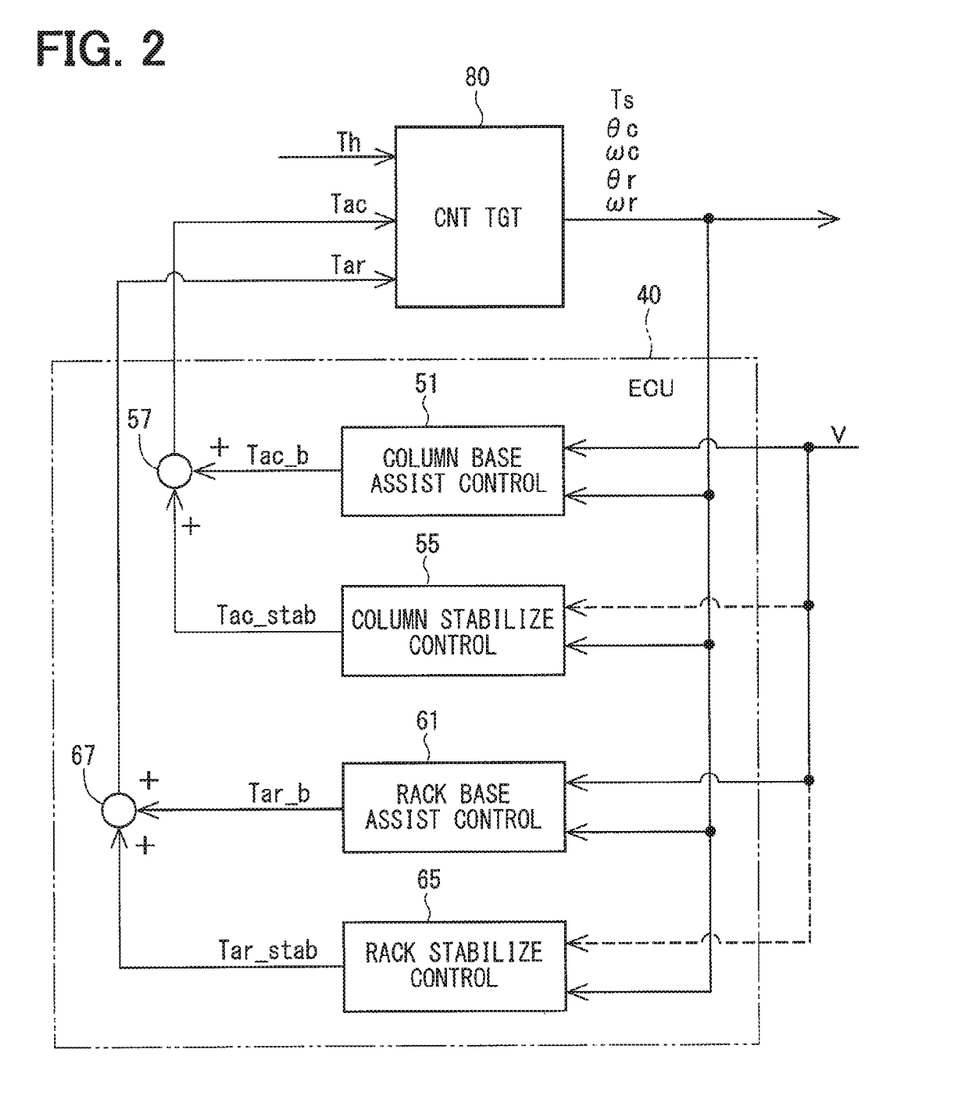
FIG. 2 is a control block diagram of an electronic control unit (ECU) according to each of the embodiments of the present disclosure.

Additionally, the ECU 40 shown in FIG. 2 further includes a column stabilization controller 55 and a rack stabilization controller 65 that calculate a stabilization torque that stabilizes the steering system, respectively. The stabilization torque is an element added to the base assist torque in order to suppress the resonance caused by a spring component of the steering system. The column stabilization controller 55 and the rack stabilization controller 65 respectively calculate a column stabilization torque Tac_stab and a rack stabilization torque Tar_stab based on information such as the torsion torque Ts. The column stabilization torque Tac_stab is added to the column base assist torque Tac_b by an adder 57, and a column assist torque Tac after such an addition is output to a control target 80. Similarly, the rack stabilization torque Tar_stab is added to the rack base assist torque Tar_b by an adder 67, and a rack assist torque Tar after such an addition is output to the control target 80.

Further, in FIG. 2, the "control target 80" includes the entire steering system from the steering wheel 91 to the tire 99 shown in FIG. 1 as well as the column motor 81 and the rack motor 82. A steering torque Th, the column assist torque Tac and the rack assist torque Tar are input to the control target 80. The torsion torque Ts output from the control target 80 is acquired by each of the controllers 51, 55, 61, 65.

Basically, a column motor angle $\theta c$ and a column motor angular speed $\omega c$ are acquired by the column base assist controller 51 and the column stabilization controller 55, and a rack motor angle $\theta r$ and a rack motor angular speed $\omega r$ are acquired by the rack base assist controller 61 and the rack stabilization controller 65. However, the column motor angle $\theta c$ and the column motor angular speed $\omega c$ may be acquired by the rack base assist controller 61 and the rack stabilization controller 65, and conversely, the rack motor angle $\theta r$ and the rack motor angular speed $\omega r$ may be acquired by the column base assist controller 51 and the column stabilization controller 55.

Further, the vehicle speed V is input to the column base assist controller 51 and the rack base assist controller 61. As indicated by a broken line, the vehicle speed V may be or may not be input to the column stabilization controller 55 and the rack stabilization controller 65. That is, the stabilization controllers 55 and 65 may use information on the vehicle speed V for a control or not.

In the present embodiment, the contents of a control of the ECU 40 are not particularly considered. Rather, whether the torsion torque Ts used for a control by the ECU 40 is the column torsion torque Tsc detected by the column torque sensor 941 or the rack torsion torque Tsr detected by the rack torque sensor 942 is the focus in the present embodiment.

Next, the relationship between the assist torques Tac and Tar in electric power steering devices 101 to 103 according to the first to third embodiments is described in order with reference to FIGS. 3 to 5. As an explanation of common features at first, in FIGS. 3 to 5, a suspension 98 provided between the rack 97 and the tire 99 is shown by a spring symbol as a portion having a spring elasticity in the steering system 90. Also, the torque sensors 941 and 942 in which elasticity is provided by the torsion bar are shown by spring symbols.

The spring symbol of the column torque sensor 941 has the letter of the column torsion torque "Tsc" written along with it, and the spring symbol of the rack torque sensor 942 has the letter of the rack torsion torque "Tsr" written along with it. Further, a term "Th" attached to the steering wheel 91 is a steering torque of the driver, and a term "Tti" attached to the suspension 98 is a torque output to a tire point.

The rotation of the column motor 81 is decelerated by the column speed reducer 815 whose reduction ratio is nc (>1), and is transmitted to the steering shaft 93. In other words, the column assist torque Tac output by the column motor 81 is multiplied by nc, and is transmitted to the steering shaft 93. When the column speed reducer 815 is implemented as gears, the reduction ratio is more specifically a "reduction gear ratio."

The rotation of the rack motor 82 is decelerated by a rack speed reducer 825 having a reduction ratio of nr (>1), and is converted into a linear motion by a pinion 86, and is transmitted to the rack 97. In other words, the rack assist torque Tar output from the rack motor 82 is multiplied by nr, converted into the linear motion, and transmitted to the rack 97. When the rack speed reducer 825 is implemented as gears just like the column speed reducer 815, the reduction ratio is, more specifically the "reduction gear ratio."

Other terms used in mathematical equations are defined as follows.

(A) An EPS assist torque, which is the total assist torque of the electric power steering system: Teps (B) An assist gain of the column assist torque Tac with respect to the torsion torque Ts*: Kac*($\geq 0$)

(C) An assist gain of the rack assist torque Tar with respect to the torsion torque Ts*: Kar*($\geq 0$)

The assist gain term includes the type of the motor to be controlled as the third character following "Ka", and includes the type of the torsion torque Ts used for a control as the fourth character. The third character is "c" if the motor to be controlled is the column motor 81, and "r" if the motor to be controlled is the rack motor 82. The fourth character indicated by "*" in the above (B) and (C) is "c" if the torsion torque Ts used for a control is the column torsion torque Tsc, and "r" if the torsion torque Ts used for a control is the rack torsion torque Tsr.

The assist gains Kac* and Kar* never have negative values. If the assist gains Kac* and Kar* ever have negative values, an assist force in the opposite direction is output with respect to the drivers steering wheel input. Such an event is called as a "reverse assist," and must be avoided as it acts against the driver's intention. Further, as long as it is premised that the assist operation is performed by the two motors 81 and 82, Kac*>0 and Kar*>0 are satisfied in principle. However, assuming that only one motor is driven when the other of the two, i.e., one of the motors 81, 82, fails, Kac*=0 or Kar*=0 may exceptionally be satisfied, which is shown by "$\geq$" in (B) and (C) described above. However, even in such case, it is assumed that Kac*=0 and Kar*=0 will not be satisfied at the same time.

[Number 4] to [Number 11] shown in black brackets in the following equations are formal numberings indicating the order in which an image data is pasted, and the equations are basically identified by the equation number in round brackets ( ). Commonly in each of the three embodiments, a steady-state equation of the assist torque is represented by equations (1) and (2). As shown in the equation (1), the torque Tti output to the tire point is a value obtained by adding the steering torque Th of the driver and the EPS assist torque Teps. The EPS assist torque Teps is represented by the equation (2) using the reduction ratios nc and nr.

[Number 4]

$$T_{ti} = T_h + T_{eps} \tag{1}$$

$$T_{eps} = n_c T_{ac} + n_r T_{ar} \tag{2}$$

The assist torques Tac and Tar in the equation (2) are calculated using the torsion torque Ts and the assist gains Kac* and Kac* for each of the following embodiments.

First Embodiment

Subsequently, the description is given to the first to third embodiments. In the electric power steering device of each embodiment, the third digit following "10" is assigned as the number of the respective embodiments. First, referring to FIG. 3, the relationship between the assist torques Tac and Tar in the electric power steering device 10 of the first embodiment is described. FIG. 3 shows the column torsion torque Tsc detected by the column torque sensor 941 is in the middle of the steering shaft 93. The ECU 40 calculates the column assist torque Tac and the rack assist torque Tar based on the column torsion torque Tsc.

The terms of the assist gain used in the first embodiment are as follows.

(B1) An assist gain of the column assist torque Tac with respect to the column torsion torque Tsc: Kacc (C1) An assist gain of the rack assist torque Tar with respect to the column torsion torque Tsc: Karc Since the column torsion torque Tsc is equal to the steering torque Th, an equation (3) is satisfied for the column assist torque Tac.

Further, an equation (4) is satisfied for the rack assist torque Tar.

[Number 5]

$$T_{ac} = K_{acc} T_{sc} = K_{acc} T_h \tag{3}$$

$$T_{ar} = K_{arc} T_{sc} = K_{arc} T_h \tag{4}$$

Substituting the equations (3) and (4) into the equation (2), the equation (5) for the EPS assist torque Teps is obtained.

[Number 6]

$$T_{eps} = n_c K_{acc} T_h + n_r K_{arc} T_h = (n_c K_{acc} + n_r K_{arc}) T_h$$

$$K_{acc} \geq 0, \ K_{arc} \geq 0, \ n_c > 1, \ n_r > 1 \tag{5}$$

In the first embodiment, the ECU 40 calculates the EPS assist torque Teps based on the equation (5). Therefore, in the twin assist type electric power steering device 101, the assist torque in the configuration that uses the column torque sensor 941 for a control is appropriately calculable.

Second Embodiment

Next, referring to FIG. 4, the relationship between the assist torques Tac and Tar in an electric power steering device 102 of the second embodiment is described. FIG. 4 illustrates a rack torsion torque Tsr detected by the rack torque sensor 942 in the middle of the intermediate shaft 95, instead of the column torsion torque Tsc of FIG. 3. The ECU 40 calculates the column assist torque Tac and the rack assist torque Tar based on the rack torsion torque Tsr.

In the second embodiment, the terms of the assist gain in (B2) and (C2) below differ from those in the first embodiment. Other terms conform to the first embodiment.

(B2) An assist gain of the column assist torque Tac with respect to the rack torsion torque Tsr: Kacr (C2) An assist gain of the rack assist torque Tar with respect to the rack torsion torque Tsr: Karr The rack torsion torque Tsr is represented as a sum of (i) the steering torque Th and (ii) "a torque (nc×Tac) which is an output torque of the column motor 81 transmitted via the speed reducer 815." Therefore, an equation (6) is satisfied for the column assist torque Tac. An equation (7) is obtained by organizing the equation (6).

[Number 7]

$$T_{ac} = K_{acr} T_{sr} = K_{acr}(T_h + n_c T_{ac}) \tag{6}$$

$$T_{ac} = \frac{K_{acr}}{1 - n_c K_{acr}} T_h \tag{7}$$

An equation (8) is satisfied for the rack assist torque Tar. Substituting the equation (7) into the equation (8) yields an equation (9).

[Number 8]

$$T_{ar} = K_{arr}T_{sr} = K_{arr}(T_h + n_c T_{ac}) \quad (8)$$

$$T_{ar} = \frac{K_{arr}}{1 - n_c K_{acr}} T_h \quad (9)$$

By substituting the equations (8) and (9) into the equation (2), an equation (10) for the EPS assist torque Teps is obtained.

[Number 9]

$$T_{eps} = \frac{n_c K_{acr} + n_r K_{arr}}{1 - n_c K_{acr}} T_h \quad (10)$$

$$0 \leq K_{acr} < \frac{1}{n_c}, K_{arr} \geq 0, n_c > 1, n_r > 1$$

Here, a possible range of a value of the assist gain Kacr appearing in the denominator of the equation (10) is considered. In case that Kacr=(1/nc), the denominator of the equation (10) becomes 0, which is not suitable because Teps=∞. When Kacr>(1/nc), the denominator of the equation (10) is negative, and the whole coefficient of Th becomes negative. That means that Teps<0, which corresponds to the above-mentioned "reverse assist." Therefore, an upper limit of the assist gain Kacr needs to be set to Kacr<(1/nc).

In the second embodiment, the ECU 40 calculates the EPS assist torque Teps based on the equation (10). Therefore, in the twin assist type electric power steering device 102, the assist torque in the configuration using the rack torque sensor 942 for a control is appropriately calculable.

Third Embodiment

Next, referring to FIG. 5, the relationship between the assist torques Tac and Tar in an electric power steering device 103 of the third embodiment is described. FIG. 5 illustrates both the column torsion torque Tsc of FIG. 3 and the rack torsion torque Tsr of FIG. 4. The ECU 40 calculates the column assist torque Tac based on the column torsion torque Tsc, and calculates the rack assist torque Tar based on the rack torsion torque Tsr.

In the third embodiment, (B1) of the first embodiment and (C2) of the second embodiment are used as the terms of the assist gain. Other terms conform to the first and second embodiments.

(B1) An assist gain of the column assist torque Tac with respect to the column torsion torque Tsc: Kacc (C2) An assist gain of the rack assist torque Tar with respect to the rack torsion torque Tsr: Karr An equation (11) same as the equation (3) of the first embodiment is satisfied for the column assist torque Tac. Further, an equation (12) same as the equation (8) of the second embodiment is satisfied for the rack assist torque Tar.

[Number 10]

$$T_{ac} = K_{acc} T_h \quad (11)$$

$$T_{ar} = K_{arr}(T_h + n_c T_{ac}) \quad (12)$$

By substituting the equations (11) and (12) into the equation (2), an equation (13) for the EPS assist torque Teps is obtained.

[Number 11]

$$T_{eps} = (n_c K_{acc} + n_r K_{arr} + n_c n_r K_{acc} K_{arr}) T_h$$

$$K_{acc} \geq 0, K_{arr} \geq 0, n_c > 1, n_r > 1 \quad (13)$$

In the third embodiment, the ECU 40 calculates the EPS assist torque Teps based on the equation (13). Therefore, in the twin assist type electric power steering device 103, the assist torque in the configuration in which the column torque sensor 941 and the rack torque sensor 942 are used for a control is appropriately calculable.

Other Embodiments (A) The ECU 40 as a "calculator" is not limited to a configuration in which one ECU 40 is provided at one place as shown in FIG. 1. That is, a plurality of ECUs may be provided as a "calculator." For example, a column ECU that controls the drive of the column motor 81 and a rack ECU that controls the drive of the rack motor 82 may share such a function. In such a case, the motor and the ECU may be integrated into one body. Also, a plurality of ECUs may be connected by communication lines to communicate information with each other.

(B) The above embodiment has been described based on an assumption that the torsion torques Tsc and Tsr detected by the torque sensors 941 and 942 are used for assist control. However, in addition to the control torque sensor(s), for example, a monitoring torque sensor that is dedicated for monitoring an abnormality of the control torque sensor may be provided. In such a case, the detection value of the monitoring torque sensor is used only for comparison with the detection value of the control torque sensor, and the detection value of the monitoring torque sensor is not reflected in each of the equations of the above embodiments.

(C) The column actuator and the rack actuator are not limited to a motor that generates the rotational output, but may also be a linear actuator that generates a linear output (e.g., translational motion).

(D) The "plurality of actuators" are not limited to two actuators, i.e., one column actuator and one rack actuator, but, for example, may also be three or more actuators provided redundantly.

The steering control device is not limited to the embodiment described above, but may be implemented with various modifications that pertain to the gist of the present disclosure.

What is claimed is:

1. An electric power steering device for generating a steering assist torque by using a plurality of actuators in a steering assist system in a vehicle, in which a steering torque input to a steering wheel is transmitted to a tire via a steering shaft in a column, an intermediate shaft and a rack, the electric power steering device comprising:
   a column actuator disposed on a column side of the intermediate shaft and configured to output a column assist torque;
   a rack actuator disposed on a rack side of the intermediate shaft and configured to output a rack assist torque;
   a column torque sensor coaxially disposed on the column with the steering shaft and configured to detect a column torsion torque applied to the steering shaft; and a calculator configured to calculate an instruction value of the column assist torque and an instruction value of the rack assist torque based on the column torsion torque, wherein when designating a steering torque as Th, an EPS assist torque representing a total assist torque of the electric power steering device as Teps an assist gain of the column assist torque with respect to the column torsion torque as Kacc, an assist gain of the rack assist torque with respect to the column torsion torque as Karc, a speed reduction ratio of a column speed reducer reducing a rotation speed of the column actuator and transmitting rotation to the steering shaft as nc, and a speed reduction ratio of a rack speed reducer reducing a rotation speed of the rack actuator and transmitting rotation to the rack as nr, the calculator calculates the EPS assist torque based on an equation 1 described below, $$T_{eps}=n_c K_{acc} T_h + n_r K_{arc} T_h = (n_c K_{acc} + n_r K_{arc}) T_h$$

$$K_{acc} \geq 0,\ K_{arc} \geq 0,\ n_c > 1,\ n_r > 1 \qquad \text{Equation 1.}$$

2. An electric power steering device for generating a steering assist torque by using a plurality of actuators in a steering assist system in a vehicle, in which a steering torque input to a steering wheel is transmitted to a tire via a steering shaft in a column, an intermediate shaft and a rack, the electric power steering device comprising:

a column actuator disposed on a column side of the intermediate shaft and configured to output a column assist torque;

a rack actuator disposed on a rack side of the intermediate shaft and configured to output a rack assist torque;

a rack torque sensor coaxially disposed with the intermediate shaft and configured to detect a rack torsion torque applied to the intermediate shaft; and a calculator configured to calculate an instruction value of the column assist torque and an instruction value of the rack assist torque based on the rack torsion torque, wherein when designating a steering torque as Th, an EPS assist torque representing a total assist torque of the electric power steering device as Teps an assist gain of the column assist torque with respect to the column torsion torque as Kacc, an assist gain of the rack assist torque with respect to the column torsion torque as Karc, a speed reduction ratio of a column speed reducer reducing a rotation speed of the column actuator and transmitting rotation to the steering shaft as nc, and a speed reduction ratio of a rack speed reducer reducing a rotation speed of the rack actuator and transmitting rotation to the rack as nr, the calculator calculates the EPS assist torque based on an equation 2 described below, $$T_{eps} = \frac{n_c K_{acr} + n_r K_{arr}}{1 - n_c K_{acr}} T_h \qquad \text{Equation 2}$$

$$0 \leq K_{acr} < \frac{1}{n_c},\ K_{arr} \geq 0,\ n_c > 1,\ n_r > 1.$$

3. An electric power steering device for generating a steering assist torque by using a plurality of actuators in a steering assist system in a vehicle, in which a steering torque input to a steering wheel is transmitted to a tire via a steering shaft in a column, an intermediate shaft and a rack, the electric power steering device comprising:

a column actuator disposed on a column side of the intermediate shaft and configured to output a column assist torque;

a rack actuator disposed on a rack side of the intermediate shaft and configured to output a rack assist torque;

a column torque sensor coaxially disposed on the column with the steering shaft and configured to detect a column torsion torque applied to the steering shaft;

a rack torque sensor coaxially disposed with the intermediate shaft and configured to detect a rack torsion torque applied to the intermediate shaft; and a calculator configured to calculate an instruction value of the column assist torque based on the column torsion torque and calculating an instruction value of the rack assist torque based on the rack torsion torque, wherein when designating a steering torque as Th, an EPS assist torque representing a total assist torque of the electric power steering device as Teps an assist gain of the column assist torque with respect to the column torsion torque as Kacc, an assist gain of the rack assist torque with respect to the column torsion torque as Karc, a speed reduction ratio of a column speed reducer reducing a rotation speed of the column actuator and transmitting rotation to the steering shaft as nc, and a speed reduction ratio of a rack speed reducer reducing a rotation speed of the rack actuator and transmitting rotation to the rack as nr, the calculator calculates the EPS assist torque based on an equation 3 described below, $$T_{eps} = (n_c K_{acc} + n_r K_{arr} + n_c n_r K_{acc} K_{arr}) T_h$$

$$K_{acc} \geq 0,\ K_{arr} \geq 0,\ n_c > 1,\ n_r > 1 \qquad \text{Equation 3.}$$

* * * * *